May 14, 1963 J. W. WALLACE ETAL 3,089,363
STRIP THICKNESS CONTROL APPARATUS
Filed May 29, 1957 4 Sheets-Sheet 1

WITNESSES:
Bernard R. Gieguay
Robert C. Baird

INVENTORS
John W. Wallace, Robert E. Hull
and Raymond W. Moore.
BY H.Y. Brodahl
ATTORNEY United States Patent Office 3,089,363
Patented May 14, 1963

3,089,363
STRIP THICKNESS CONTROL APPARATUS
John W. Wallace, Orchard Park, and Robert E. Hull, Amherst, N.Y., and Raymond W. Moore, Whitehall, Pa., assignors to Westinghouse Electric Corporation, East Pittsburgh, Pa., a corporation of Pennsylvania
Filed May 29, 1957, Ser. No. 662,479
11 Claims. (Cl. 80—56)

The present invention relates, in general, to control apparatus for controlling a predetermined operation relative to a workpiece, and more particularly relates to control apparatus for controlling the thickness or gauge of a strip of material, such as metal.

It is an object of the present invention to provide improved control apparatus of the type under consideration, and more particularly to provide improved apparatus for controlling the operation of one or more motors of a strip rolling mill or the like, to thereby better control the gauge or thickness of the strip relative to a particular stand of the mill.

It is a further object of the present invention to provide improved control apparatus for controlling the relative positions of a pair of work members that are operative with a moving workpiece, such that the time period required to measure or sense the operation of said work members relative to a predetermined and desired reference operation is employed as a limit or standard for the subsequent control operation including any required correction operations to be made.

It is an additional object of the present invention to provide improved faster acting and more accurate control apparatus for a strip rolling mill, which apparatus is operative for a first predetermined time period to sense the actual operation of the mill and make any desired corrections or changes to that operation, and then during a second predetermined time period is operative to reset itself in accordance with the start of said first time period.

It is another object of the present invention to provide improved control apparatus for a strip rolling mill, which apparatus more rapidly responds to any deviation or error in the operation of the mill relative to a predetermined desired or reference operation, and is faster acting to more rapidly correct for and remove any such deviation or error in the mill operation to thereby more accurately control the operation of the rolling mill.

It is a different object of the present invention to provide improved control apparatus for a strip rolling mill, which apparatus is operative to better control the strip gauge or thickness by better controlling the screwdown spacing of the roller members of any particular stand.

It is still another object of the present invention to provide improved control apparatus for a strip rolling mill for better holding the screwdown spacing of a particular pair of roller members substantially constant or as may be desired relative to a predetermined reference spacing and to thereby improve the operation of the rolling mill regarding on-gauge or desired thickness strip.

These and other objects and advantages of the present invention will become apparent in view of the following description taken in conjunction with the drawings, wherein.

Figure 1:
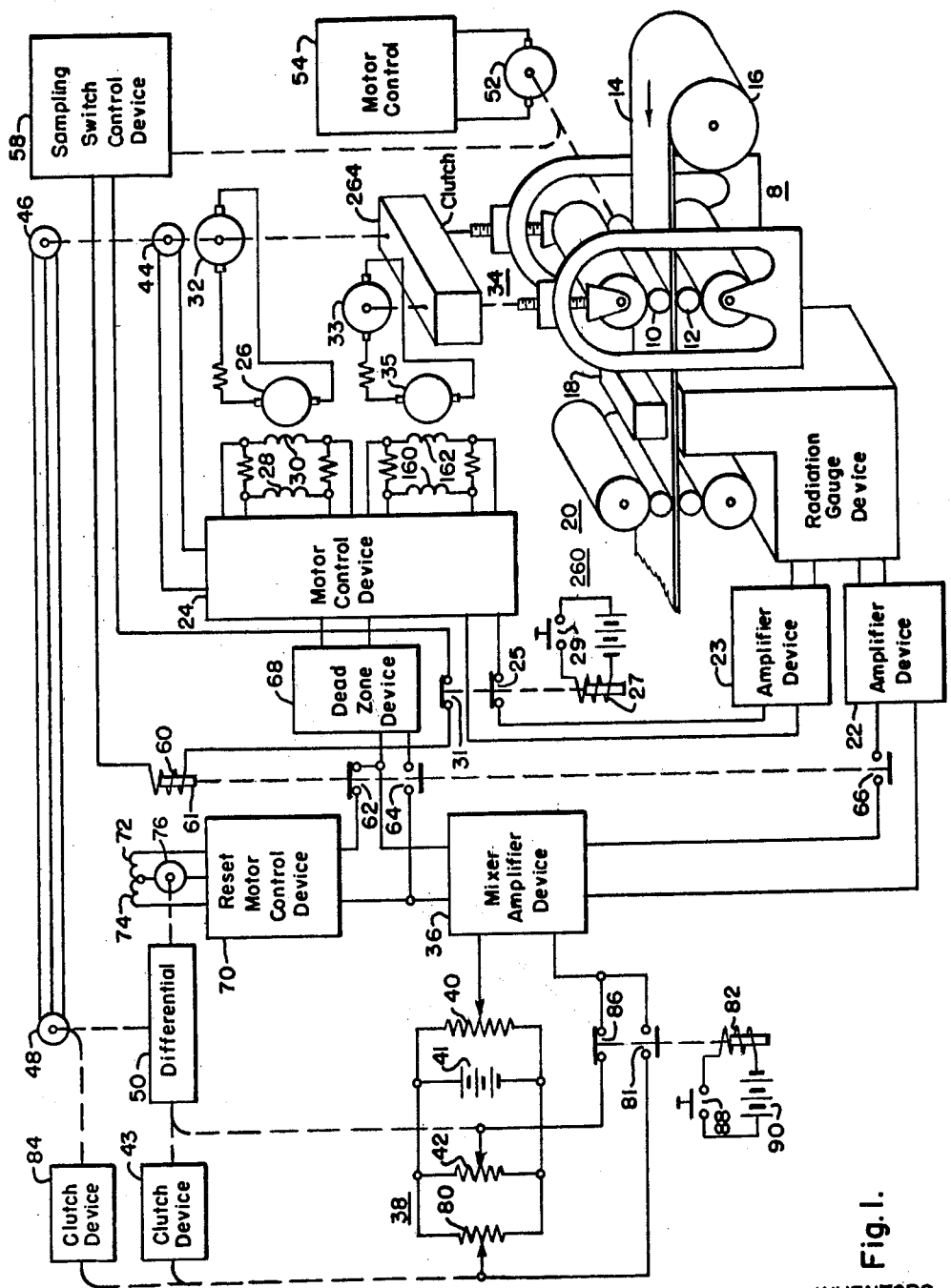
FIGURE 1 is a diagrammatic showing of control apparatus in accordance with the present invention.

In FIG. 1 there is shown a stand of a rolling mill 8 including a pair of roller members 10 and 12 operative with a continuous strip 14 of metal or like material moving from an entry reel 16 through the rolling mill 8 and a radiation gauge 18 operative to measure the thickness of the strip and then through a subsequent pair of roller members in a succeeding stand 20 of the rolling mill. The radiation gauge 18 is operative to provide a control signal through an amplifier device 22, which control signal has a magnitude that varies as a function of the thickness of the strip 14 relative to a predetermined desired or reference thickness. The same control signal also is supplied through the amplifier device 23 to a motor control device 24 for controlling the operation of a supply generator 26 by controlling the energization of a pair of field windings 28 and 30 of that supply generator 26 to, in turn, control the operation of a screwdown motor 32 operatively connected to a screwdown device 34 for controlling the spacing between the roller members 10 and 12. The output of the amplifier device 22 is applied to a mixer amplifier device 36 as a first control signal. A control bridge circuit 38 including a first reference potentiometer device 40 and a second servo or bridge reset potentiometer device 42 is connected to supply a second control signal to the mixer amplifier device 36. The control arm of the first potentiometer device 40 is varied in position to provide a reference point for the second potentiometer 42 and the third potentiometer 80 regarding their range or movement of operation. The control arm of the second potentiometer device 42 is varied in position in accordance with the actual spacing between the roller members 10 and 12 as determined by the motors 32 and 33 and the operation of the screwdown device 34. A synchro transmitter device or motor 46 is operatively connected to the screwdown device 34 and controls the operation of a synchro receiver device 48 which is connected to one input of a differential mechanism 50. The contact arm of the second potentiometer device 42 is varied in position by a second output of the differential device 50 in accordance with the actual spacing between the roller members 10 and 12 as determined by the screwdown device 34.

A mill motor 52 is connected to the roller members 10 and 12 for controlling the operative speed of the latter roller members as determined by a conventional and well known motor control device 54. The mill motor 52 is operatively connected to a sampling switch control device 58 in accordance with the operative speed of the roller members 10 and 12. The sampling switch control device 58, in turn, controls the energization of a control winding 60 operative to open or close the respective switch members 62, 64 and 66 in a periodic or cyclical manner and at a rate dependent upon the operating speed of the roller members 10 and 12. With the armature 61 in its position as shown in FIG. 1, the switch members 64 and 66 are disconnected to thereby disconnect the amplifier device 22 from the mixer amplifier device 36 and further to disconnect the mixer amplifier device 36 from a dead-zone device 68 leading to the motor control device 24.

In the position of the armature member 61, as shown in FIG. 1, the output of the mixer amplifier device 36 is connected through the switch member 62 to a reset motor control device 70 which, in turn, controls the energization of the field windings 72 and 74 of a reset motor 76 operative through a third input of the differential mechanism 50 as will be later explained.

A screw reset potentiometer device 80 is connected for energization by the voltage source 41 and has an adjustable contact member connected through a switch member 81 of a screw reset control armature 82. The control arm of the potentiometer device 80 is operatively connected through a clutch device 84 with the output of the synchro receiver device 48. The contact arm of the servo reset potentiometer device 42 is connected through a second switch member 86 operatively connected to the armature member 82, as shown in FIG. 1. A screw reset control switch member 88 is operative with a voltage source 90 for controlling the closure of the switch member 81 and the opening of the switch member 86 when it is desired to reset the screwdown device 34 for providing a predetermined or preset spacing between the roller members 10 and 12, as will be later explained.

The output control signal from the radiation gauge 18 which varies as a function of the thickness of the strip 14 relative to a reference thickness is applied through the second amplifier device 23 to the motor control device 24 through a control switch 25 which is normally closed, but upon closing of a "jog" control switch member 29, the switch 25 is opened. Also, the sampling system is deenergized temporarily through a control switch 27.

Figure 6:
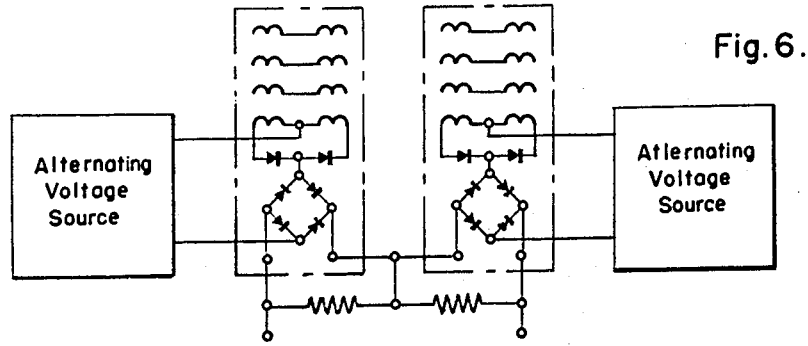
FIG. 6 shows a conventional magnetic amplifier push-pull circuit arrangement.

In FIG. 1 there is shown the upper roller member 10 and the lower roller member 12 operative with the strip 14 of metal or like material, with the radiation gauge 18 positioned a predetermined distance away from the roller members which distance, in actual practice, is in the order of six or eight feet, for sensing the actual thickness of the strip 14 at the location of the radiation gauge 18. The output control signal from the radiation gauge 18 is operative as well known to persons skilled in this art to control the operation of a servo motor 100 shown in FIG. 2 and which, in turn, controls the position of contact arms on respective potentiometer devices 102 in a first control bridge 104 and potentiometer device 106 in a second control bridge 108. The first control bridge 104 includes a second potentiometer member 110 having a contact arm that is varied or preset in accordance with a predetermined desired thickness for the strip 14, such that as the contact arm of the potentiometer device 102 is varied in accordance with actual strip thickness, any difference between the setting of the actual thickness potentiometer device 102 as compared to the setting of the reference thickness potentiometer device 110 results in an output signal having a magnitude and a polarity dependent upon such difference and whether the actual thickness is above or below the predetermined desired or reference strip thickness. A suitable plurality of input control windings of the amplifier device 22 are energized in accordance with the latter difference signal. The amplifier device 22 may include a pair of magnetic amplifier devices connected to be operative in the well known push-pull arrangement, as shown in FIG. 6, with the output signal from the amplifier device 22 being applied across the control windings 112 and 114 of the mixer amplifier device 36.

The second bridge circuit 108 includes a second variable impedance or reference thickness potentiometer device 116 having a contact arm the position of which is adjusted or preset in accordance with a predetermined desired thickness for the strip 14, such that any difference in the settings of the potentiometer devices 106 and 116 results in an output control signal having a magnitude and a polarity dependent upon the thickness error magnitude and the direction of the thickness error either above or below the predetermined desired thickness for the strip 14. This latter output control signal from the bridge circuit 108 is applied across a suitable plurality of input control windings of the amplifier device 23, which latter amplifier device 23 also may include a pair of magnetic amplifier devices connected in the conventional and well known push-pull circuit arrangement, as shown in FIG. 6, to provide an output control signal which is applied through the switch member 25 to the control windings 118 and 120 of the amplifier device 122.

Figure 3:
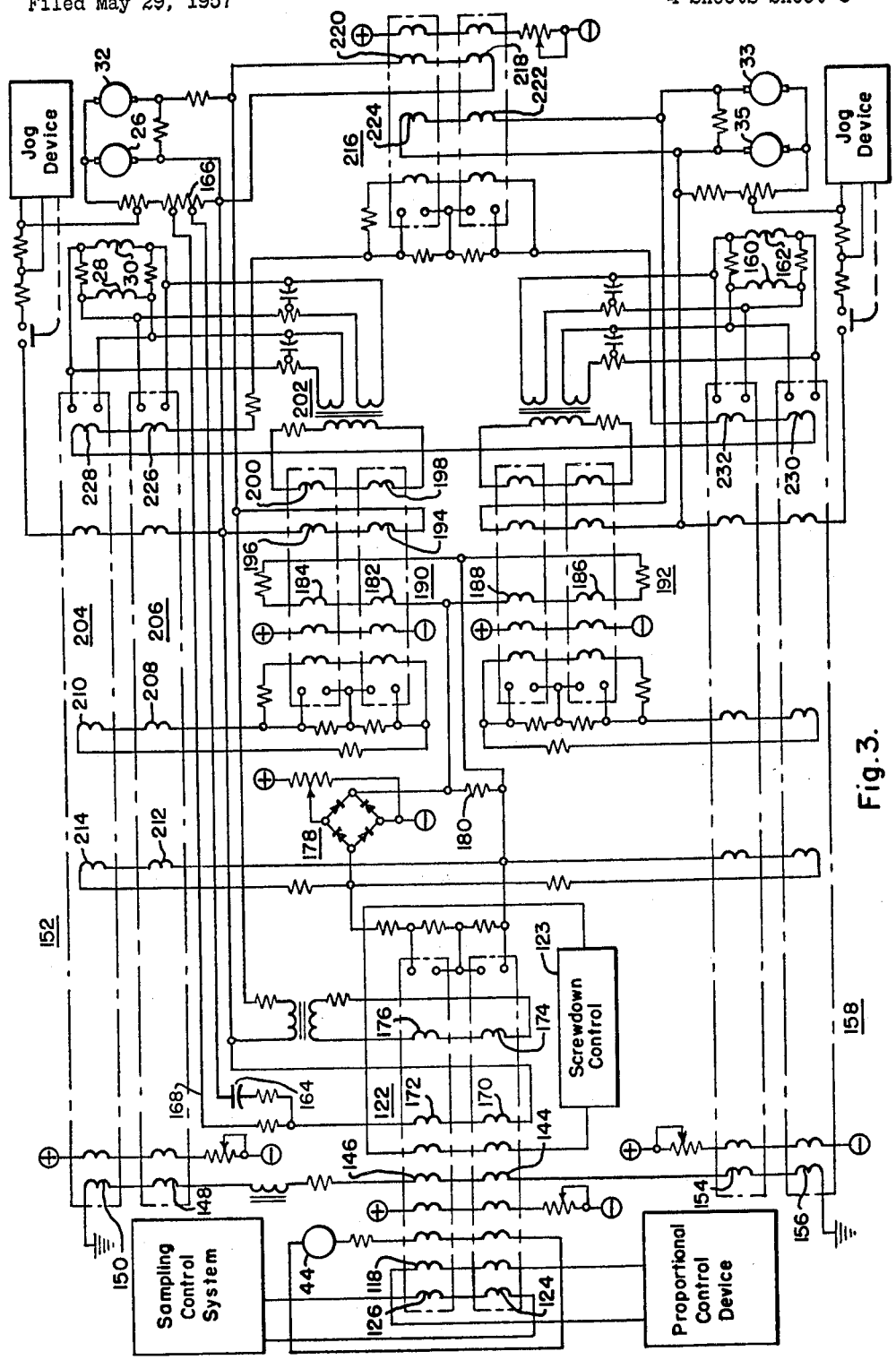
FIG. 3 is a schematic showing of a second portion of the control apparatus in accordance with the present invention.

The output control signal from the amplifier device 36, which may include a pair of push-pull connected magnetic amplifier devices, is applied through a conventional dead-zone device 68 to the control windings 124 and 126 of the amplifier device 122, within the motor control device 24, such that for a given magnitude of thickness error and a given direction of thickness error of the strip 14 as compared to a predetermined desired thickness, the control signal applied from the amplifier device 36 to the control windings 124 and 126 of the amplifier device 122 is additive relative to the control signal applied by the amplifier device 23 to the control windings 118 and 120. The amplifier device 122, in turn, and as shown in FIG. 3, may include a pair of magnetic amplifier devices connected in the conventional push-pull circuit arrangement for controlling the operation of the screwdown motors 32 and 33 which, in turn, control the screwdown device 34 for each of the respective ends of the upper roller member 10, as well known to persons skilled in this art. In this respect, a tachometer device 44 is connected to the screwdown motor 32 for providing a feedback speed control signal to the motor control device 24 for stabilizing the operation of the latter motor control device 24.

The output of the amplifier device 36 is applied through a normally closed switch member 62 to the control windings 130 and 132 of an amplifier device 134 for controlling the operation of the servo reset motor 76 shown in FIG. 1. In this regard, the forward control field winding 72 and the reverse control field winding 74 are connected to the output of the amplifier device 134 including a pair of magnetic amplifier devices connected in the well known push-pull circuit arrangement as shown in FIG. 6. A tachometer generator 136 is operative with the motor 76 for providing a stabilizing speed feedback signal to the amplifier device 134. The servo reset motor 76 is connected through one input of the differential mechanism 50 for controlling the position of a contact arm on the actual spacing potentiometer device 42 in the bridge circuit 38 including the reference potentiometer device 40 having a contact arm that is adjusted in position to provide an adequate operating range for the potentiometers 42 and 80.

The control arm on the screw reset potentiometer device 80, as previously explained, is connected to the output of the synchro receiver device 48 through a clutch device 84.

During the screwdown reset operation at the end of each coil or strip length, when the screwdown device 34 is operated to move the roller members 10 and 12 to a predetermined desired or preset spacing, the clutch member 84 is closed and the clutch device 43 is opened, as will be later explained. Also, the switch member 81 is closed and 86 is opened such that the screws move to null out the difference voltage or balance the settings between potentiometers 80 and 40.

Figure 2:
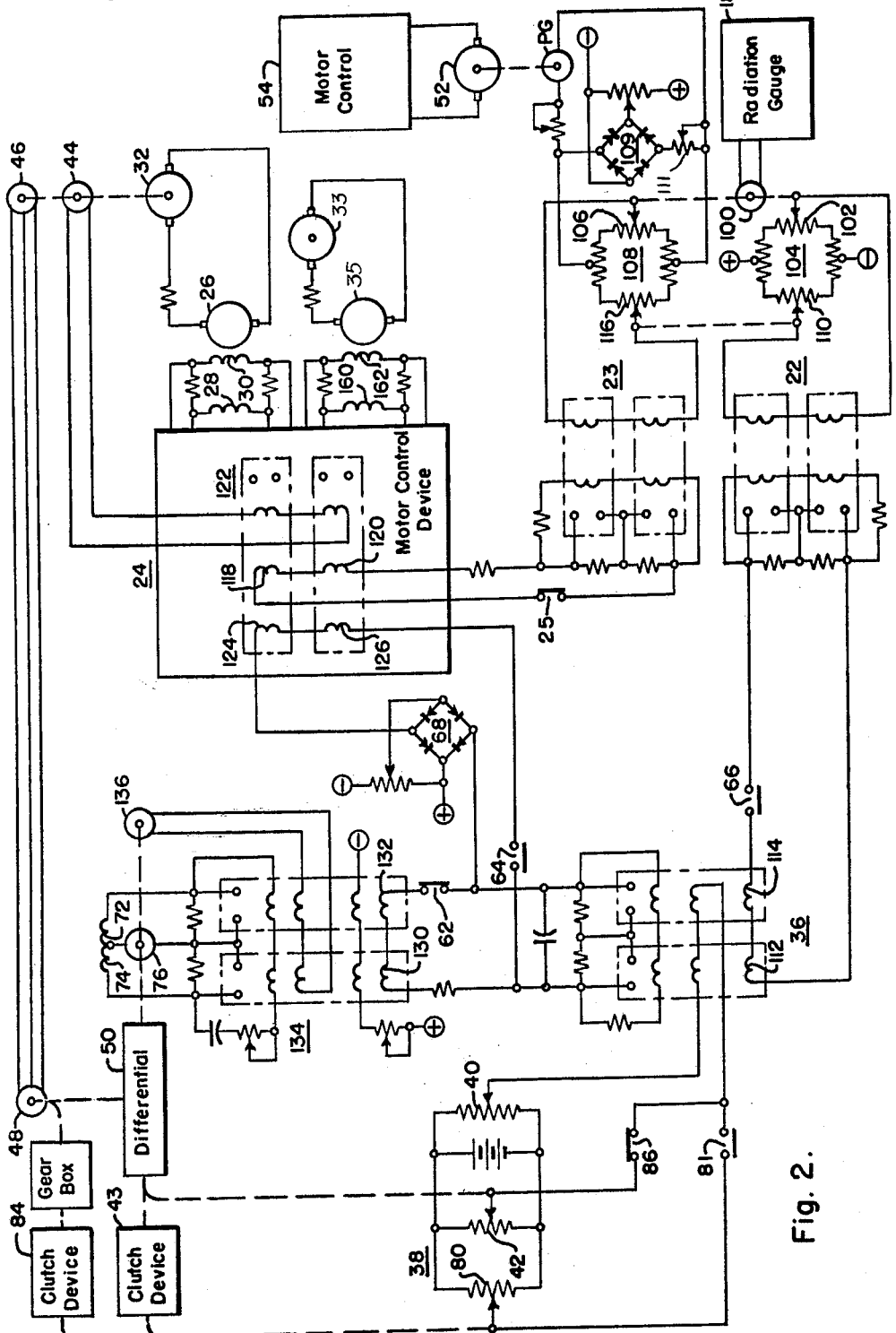
FIG. 2 is a schematic showing of a first portion of the control apparatus in accordance with the teachings of the present invention.

In FIG. 3 there is shown a schematic view of the motor control device 24 as shown in FIG. 2. In FIG. 3 the sampling control system including the amplifier device 36, the sampling switch control device 58, the relay 60 and its associated contacts 64 and 66, shown in FIG. 2, is connected to control the energization of the control windings 124 and 126 of the amplifier device 122. The proportional control system including the amplifier device 23 and the second control bridge 108, as shown in FIG. 2, is connected to control the energization of the control windings 118 and 120 of the amplifier device 122. A tachometer or pilot generator device 44, shown in FIG. 1, is connected to energize an additional pair of control windings of the amplifier device 122 for stabilization purposes. Reactance damping for the amplifier device 122 is supplied by a still additional pair of control windings 144 and 146 energized through windings 148 and 150 of a first motor controlling amplifier device 152, and windings 154 and 156 of a second motor controlling amplifier device 158, to provide flux rate damping for the amplifier device 122. The latter first amplifier device 152 comprises a pair of magnetic amplifiers connected in the conventional push-pull circuit arrangement for energizing the field windings 28 and 30 of the generator 26 connected to supply energy to the screwdown motor 32. The amplifier device 158 comprises a pair of magnetic amplifiers connected in the conventional push-pull circuit arrangement for energizing the field windings 160 and 162 of the generator 35 connected to energize the second screwdown motor 33.

A voltage rate of change feedback signal is applied through a capacitor 164 from across a portion of an impedance device 166 connected to respond to the rate of change of the voltage of generator 26. A negative feedback signal is supplied through a conductor 168, with the latter said voltage rate of change feedback signal and the negative feedback signal being combined to control the energization of a pair of control windings 170 and 172 of the amplifier device 122. An armature current rate of change feedback control signal, and responsive to the rate of change of the armature current of the screwdown motor 32, is provided across a pair of control windings 174 and 176 of the amplifier device 122. The output or load windings of the amplifier device 122 are conected in a conventional push-pull circuit arrangement, as shown in FIG. 6, through a limiter device 178 operative to limit the effective armature current for the screwdown motors 32 and 33, for higher values of strip thickness or screwdown error in the position of the screwdown motors 32 and 33 as compared to a predetermined or desired screwdown position. The output signal from the amplifier device 122, after passing through the limiter device 178, is applied across an impedance member 180, which supplies the control signal to the control windings 182, 184, 186 and 188 of respective amplifier devices 190 and 192. The control windings 194 and 196 of the amplifier device 190 are supplied with an armature current feedback signal which varies as a function of the current of the armature of screwdown motor 32. The control windings 198 and 200 are energized in accordance with a voltage rate of change difference signal received through the transformer device 202 having one primary winding energized as a function of the rate of change of the voltage of the magnetic amplifier device 204 and a second primary winding energized in accordance with the rate of change of the output voltage of the amplifier device 206, both of which latter magnetic amplifiers are included in the amplifier device 152 for controlling the operation of the screwdown motor 32. The primary windings of the transformer device 202 are differentially connected such that a difference between the respective output voltage rates of change are applied to the control windings 198 and 200. The output or load windings of the amplifier device 190 are connected in a conventional push-pull circuit arrangement for energizing control windings 208 and 210 of the amplifier device 152 to effectively buck out part of the screwdown error signal to stay below the rated maximum value for the armature current of the screwdown motor 32. The control windings 212 and 214 of the amplifier device 152 are energized by the output of the amplifier device 122 in accordance with the screwdown error signal corresponding to the difference between the actual screwdown or spacing between the roller members relative to a predetermined desired or reference spacing.

The amplifier device 192 is, in general, similarly operative relative to the amplifier device 158 for controlling the operation of the screwdown motor 33, as will be apparent to a person skilled in this art.

An amplifier device 216 is provided for load balancing purposes having a first pair of control windings 218 and 220 energized in accordance with the armature current of the screwdown motor 32 and a second pair of control windings 222 and 224 energized in accordance with the armature current of the screwdown motor 33, for providing a control signal to the control windings 226 and 228 of the amplifier device 152 and to the control windings 230 and 232 of the amplifier device 158 to prevent exceeding the maximum rated value of the armature current for the respective screwdown motors 32 and 33, and to effect a balance between the loads assumed by the respective screwdown motors.

The field bridge circuit including the fields 28 and 30 for the generator 26, and the field bridge circuit including the field windings 160 and 162 for the generator 35 are believed to be well known to persons skilled in this particular art.

In this regard, the control apparatus, as shown in FIG. 2 and FIG. 3, is operative as a variable voltage screwdown motor control for controlling the operation of the screwdown motor 32 and the screwdown motor 33 relative to the screwdown device or devices 34 for controlling the relative spacing between the upper roller member 10 and the lower roller member 12. In this regard, it should be noted that a suitable clutch device is normally provided between the outputs of the screwdown motors 32 and 33 to hold the roller members substantially parallel in their operation.

Figure 4:
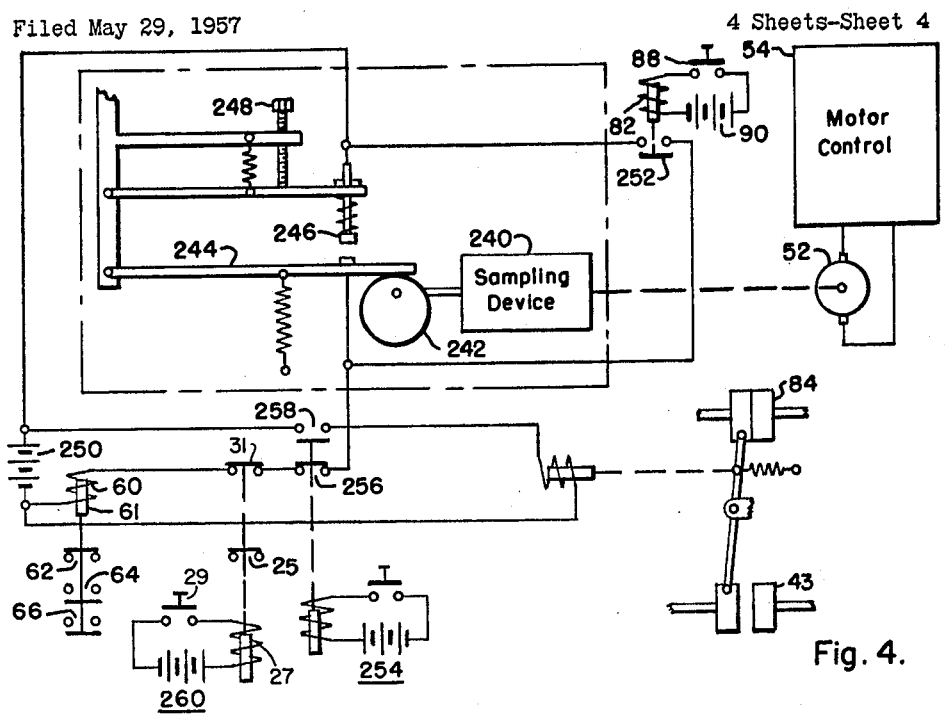
FIG. 4 is a schematic view illustrating the sampling operation of the present control apparatus.

In FIG. 4 there is shown a circuit schematic of the sampling control system for the subject control apparatus. The sampling switch control device 58, shown in FIG. 1, includes a sampling device 240, which may comprise a suitable gear box or the like, operative with a cam member 242 for controlling the position of a contact arm 244 relative to a second contact member 246, such that as the sampling device 240 operates as a function of the operating speed of the mill stand motor 52, the cam 242 is accordingly rotated to control the energization of the sampling control winding 60 relative to the armature 61 for controlling the operation of the sampling switch members 62, 64 and 66, shown in FIG. 1. In this regard, the upper contact member 246 may be adjusted in position by a screw member 248 to thereby vary the time period during which the control winding 60 is energized and likewise vary the time period when the control winding 60 is not energized. A suitable power supply 250 is operative for energizing the apparatus.

The screw reset control button 88 is operative with the armature member 82 for controlling a switch member 252 for controlling the screwdown reset operation as will be later described. A screwdown preset control device 254 is provided for controlling the positions of the switch members 256 and 258, as desired, to initially set or preset the positions of the contact arms on the potentiometer members 42 and 80 as shown in FIG. 2 in accordance with a predetermined desired thickness for the strip 14 or a predetermined desired spacing between the roller members 10 and 12, as will be later explained. A "jog" control device 260 is operative with the switch member 31 to deenergize the sampling switch control winding 60 and to deenergize the switch members 64 and 66, shown in FIGS. 1 and 2, for removing from the screwdown motor control device 24 the sampling control signal as received from the amplifier device 36 and is operative with the switch 25 to remove the proportional control signal as received from the amplifier device 23.

The screwdown motors 32 and 33 may be interconnected through a clutch device during normal operation of the control apparatus in accordance with the present invention; however, this clutch member may be opened as well known to persons skilled in this art such that each screwdown motor may be operated independently as necessary to provide a substantially parallel spaced relationship between the roller members 10 and 12 for leveling the mill as desired.

Figure 5:
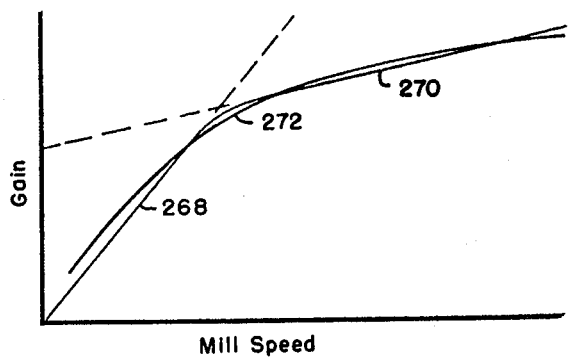
FIG. 5 is a curve chart illustrating the gain variation of the proportional control system in accordance with the present invention.

In FIG. 5 there is shown a curve chart illustrating the desired gain characteristic as a function of mill speed for the proportional system including the amplifier device 23. The bridge circuit 108, shown in FIG. 2, in combination with the limiter device 109 operative with the impedance member 111 are operative such that up to a predetermined mill speed, corresponding to a predetermined voltage level, the bridge circuit 108 is operative to provide for the proportional system a gain characteristic in accordance with the straight line curve 268. At a predetermined mill speed and its corresponding voltage level, the bridge circuit 108 becomes conductive such that the current flowing through the parallel path including the bridge circuit 108 and the impedance 111 are operative to change the gain characteristic in accordance with the slope 270 such that the desired gain characteristic as indicated by the continuous curve 272, is thereby empirically approximated and effected.

In FIG. 6 there is shown a schematic view of the well known push-pull connection of two magnetic amplifier devices as suitable for use with the present control apparatus and as well known to persons skilled in this art.

The present control apparatus was intended for controlling particularly the first stand roller members of a multiple stand tandem mill to control the strip thickness out of said first stand by controlling the effective thickness reduction accomplished by the first stand, but is not limited to this application per se. The present control system is operative to remove any variations in strip thickness due to previous hot mill operation and to enable a more accurate control of strip thickness from the tandem mill as a result thereof, the roller members are moved a given distance proportional to any thickness error. One feature of the present control apparatus is that the roller members are positioned by the sampling system regarding their relative spacing by apparatus which does not include the radiation gauge in a loop-control circuit and is not dependent upon the transport time delay from the gap between the roller members to the radiation gauge while the control system is doing the actual screwdown positioning. Therefore, the roller members can be positioned much more rapidly with no overshoot or instability. Further, for resetting the screwdowns or the spacing between the roller members 10 and 12 to a predetermined point after each pass of the mill and/or for each coil passing through the mill, the screw reset control button device 88 has been provided.

In the operation of the control apparatus in accordance with the present invention, the radiation gauge 18 is operative to detect any errors in the thickness of the strip 14 relative to a predetermined and desired reference thickness and a signal is provided from the radiation gauge 18 and its associated circuitry that is proportional to the error relative to the magnitude of the error and having a polarity corresponding to whether the actual strip thickness is above or below the predetermined desired thickness. This control signal from the radiation gauge 18 is supplied to the amplifier device 22 which boosts the power level of this error signal. This error signal is then used as a reference to the positioning system which is operative as a feedback control system and accurately positions the roller members in accordance with the predetermined desired spacing between the roller members to remove the strip thickness error. A synchro transmitter 46 is coupled to the screwdown motor 32 and is electrically coupled to a synchro receiver or repeater 48 which drives a control arm on a bridge reset potentiometer device 42 through a differential gear mechanism 50. The bridge reset potentiometer 42 is part of a control bridge circuit including a reference potentiometer 40, with the output voltage from this bridge circuit corresponding to the movement of the screwdown device for each sampling period and hence the spacing between the roller members 10 and 12. The latter signal received from the bridge circuit including the potentiometer devices 40 and 42 is supplied through the switch member 86, shown in FIG. 1, to one input of the mixer amplifier device 36 and is differentially compared to the control signal received from the amplifier device 22. When these latter two signals are of substantially the same magnitude and polarity, they cancel out in the mixer amplifier device 36 to result in no excitation of the motor control device 24 and the screwdown motors 32 and 33 and the position of the roller members 10 and 12 will be maintained. Any difference between these signals as supplied to the mixer amplifier device 36 will cause the motor control device 24 to drive the screwdown motors 32 and 33 as necessary to correct for any errors in the strip thickness, such that the roller members 10 and 12 are moved relative to each other in a direction to eliminate any strip thickness error. When the roller members 10 and 12 have been thusly positioned to provide a spacing corresponding to the predetermined desired spacing and to give the desired strip thickness, the control signals supplied to the mixer amplifier device 36 cancel each other out and the control system regulates and keeps these control signals matched until the end of the particular ON sampling cycle involved and as determined by the sampling switch control device 58 driven by the mill motor 52 at a speed corresponding to the operating speed of the mill rollers 10 and 12. During the sampling ON time period, the control winding 60 is energized to raise the armature 61 shown in FIG. 1 and to open the switch member 62 and to close the switch members 64 and 66. It is during this sample ON time period that the two control signals supplied to the mixer amplifier device 36 are operative to control the operation of the screwdown motors 32 and 33 as above described. At the end of said first sample ON time period, a sample OFF period is provided having a duration dependent upon the operating speed of the mill motor 52, and long enough for the effect of positioning the roller members through the screwdown motors 32 and 33 to be measured at the end of the required transit time delay by the radiation gauge 18. Then the sampling cycle is switched ON again and provides any additional correction of the screwdown spacing as required during the next sample ON period. Thusly, the present control apparatus alternately corrects strip thickness, then measures the need for more correction in repetitive cycles. The total sampling period including othe ON and OFF cycles is dependent upon the operating speed of the mill motor 52, but the percentage of the total period that is provided for the ON operation as compared to the OFF operation may be adjusted by the screw member 248 shown in FIG. 4. One suitable operating arrangement is to provide an equal ON period and an equal OFF period. The transport time delay period or the time it takes a given portion of the strip 14 to move from the roller members 10 and 12 to a position where the radiation gauge is located determines the total time period required for the sampling cycle. Thusly, the sampling switch control device 58 is operative as a function of mill speed.

When the sampling cycle goes into the OFF period, the thickness error signal supplied by the amplifier device 22 is removed from the mixer amplifier device 36 in that the armature 61 lowers to the illustrated position of FIG. 1 and closes the switch member 62 and opens the switch members 64 and 66. Thusly, the output of the mixer amplifier device 36 is now supplied through the switch member 62 to the reset motor control device 70 to control the operation of the reset servo motor 76 for repositioning the contact arm on the servo or bridge reset potentiometer 42 to the starting or zero point where the bridge circuit including the bridge reset potentiometer 42 and the reference potentiometer 40 is balanced or matched to give a zero output or difference voltage. The servo motor 76 operates into one side of the differential gear mechanism 50 while the screwdown devices 34 are locked such that the synchro repeater 48 is similarly locked and holds the position of the other input shaft of the differential device 50. The reset servo motor 76 then repositions the contact arm of the bridge reset potentiometer 42 to zero or reset the bridge circuit in preparation for the next sample ON time period. The unbalanced voltage of the bridge circuit including the reference potentiometer 40 and the bridge reset potentiometer 42 is a measure of how far the screwdowns have moved during each sample ON time period. If this bridge circuit is not reset to zero, the next and succeeding ON time period will run the screws back to the original position in order to match the zero error signal that should occur with the beginning of the next sample ON time period, in that during the last sample ON time period the screwdown motors 32 and 33 were operated as necessary to substantially fully correct for any thickness error.

A proportional system is also used which takes the thickness error control signal from the radiation gauge 18 and supplies it through an amplifier device 23 and a normally closed switch member 25 and feeds it directly into the motor control device 24. The proportional control system is a slower responding system because the position gain cannot be set as high as for the sampling system including the mixer amplifier device 36, or otherwise, instability would occur due to the transport time delay. However, the proportional control system may be an integrating type system and requires no steady-state error. It operates within the dead zone necessary with the sampling system. For slowly changing thickness errors, the proportional control system per se is operative to substantially maintain the predetermined desired strip thickness and the sampling system including the mixer amplifier device 36 is required primarily for rapidly changing thickness errors such as during acceleration and deceleration of the mill motor 52. However, during normal running of the rolling mill, either one of the proportional control system including the amplifier device 23 and the sampling control system including the mixer amplifier device 36 will adequately control the strip gauge or thickness as desired. Because the incoming strip thickness varies over a coil length often being a wedge shape between the beginning of the coil to the end, the position of the roller members at the end of a coil may be much in error relative to the beginning of the next coil for the purpose of providing on-gauge strip at a predetermined desired strip thickness. Thusly, an automatic screw reset feature is provided for the present control apparatus to reposition the screw members or roller members to a predetermined or initially preset position at the end of each coil or strip.

The roller members 10 and 12 may be initially preset and manually positioned by a suitable manual screwdown control device 123 well known to persons skilled in this art and operative to move through the motor control device 24 the screwdown motors 32 and 33 to the desired starting or preset position with the sampling switch control device 58 deenergized and the screw reset control switch 88 closed to close the switch member 81 and open the switch member 86. The screwdown device 34 is preset by the operator with a conventional manual screwdown control 123 operative with a control winding of the magnetic amplifier device 122 of the motor control device 24. Referring to FIG. 4, the preset control device 254 is energized to close the switch 258 and open the switch 256 to thereby deenergize the sampling switch control device 58 and to open the clutch device 84 and close the clutch device 43. Under this condition, the reset servo motor 76 is operative only to position the screw reset potentiometer 80 through the mechanical differential device 50 to maintain a null voltage or matched condition between the potentiometer device setting 80 and the reference potentiometer member 40; the screw reset potentiometer 80 and the servo or bridge reset potentiometer 42 do not follow any additionally required movement of the screwdown device 34 to preset the screws or the relative spacing between the roller members 10 and 12. After the desired preset spacing has been thus provided between the roller members 10 and 12, the preset control device 254 is deenergized to close the switch member 256 and open the switch member 258 to thereby close the clutch device 84 and open the clutch device 43. Now the screw reset switch member 88 is released to open the switch member 81 and close the switch member 86. Under this condition, the screw reset potentiometer 80 becomes a memory device, following the subsequent positioning of the screwdown motors 32 and 33 during subsequent automatic strip thickness operation and through the required plurality of sampling operations. With the switch member 86 closed, the servo reset motor 76 is now driven by any difference signal resulting from the position of the contact arm on the bridge reset potentiometer 42 relative to the position of the contact arm on the reference potentiometer 40 to cause the servo reset motor 76 to drive through the differential device 50 the contact arm of the bridge reset potentiometer 42 to match the setting of the reference potentiometer 40, such that the bridge circuit including the latter potentiometer 40 and the latter potentiometer 42 is now balanced and ready for gauge control operation.

The sampling switch control device 58 energizes the coil 60 to apply for a sample ON period of time duration less than or equal to the transport time delay the first control signal from the amplifier device 22 to the mixer device 36 where it is differentially compared with the signal from the bridge circuit including the potentiometer 40 and the potentiometer 42. Any error in strip thickness is operative to move the screwdown motors 32 and 33 in a direction and by the amount required to correct the strip thickness error. The actual movement of the screwdown motor 32 causes through the synchro transmitter 46 and synchro receiver 48 a movement of the contact arm on the potentiometer device 42 in a direction and of an amount sufficient to balance out the control signal received from the amplifier device 22. Thusly, a correction in screwdown position is made proportional to the thickness error. Now the sampling switch control device 58 enters its sample OFF period where the coil 60 is deenergized. This stops the movement of the screwdown motors 32 and 33 by the mixer amplifier device 36, and waits for a time period slightly greater than or equal to the transport time delay period to pass such that the radiation gauge 18 is operative to measure the new and corrected strip thickness. It is during this sample OFF period that the servo reset operation takes place to reset the potentiometer device 42 to match the setting of the potentiometer device 40. Then the sampling switch control device 58 again energizes the coil 60 to repeat the above operation for the sample ON period.

If, for example, the movement of the strip 14 is in the order of 6,000 feet per minute at the delivery end of the rolling mill, a time period proportional to the mill speed and in the order of one second for the total sampling cycle may be provided. In this regard, the sampling switch control device 58 may provide a sample ON period of one-third second and a reset period of two-thirds of a second, or if desired a sample ON period of one-half second and a reset period of one-half second. The radiation gauge 18 is responsive to any actual thickness error and provides a control signal proportional to this thickness error which changes the screwdown position and thusly unbalances the reset control bridge including the potentiometer 40 and the potentiometer 42 to give a bucking out signal to the mixer amplifier device 36 to cancel out the thickness error signal received from the amplifier device 22. Thusly, to remove the effect of the transport time delay and the operative delay of the radiation gauge 18 itself, the gauge thickness error signal is used as a reference but not in a closed loop to thusly move the screwdown motors 32 and 33 a calibrated amount dependent upon the actual thickness error. The provided sampling technique allows a higher gain and faster responsive system to be used which is stable and does not overcorrect in its operation. The screwdowns are moved as necessary during the sample ON period to fully correct for any measured strip thickness error and the reset winding of the amplifier device 36 fully balances out during this sample ON period the gauge error signal received from the radiation gauge 18.

The dead-zone device 68 is operative such that the screwdown motors 32 and 33 are not moved until the thickness error has a predetermined magnitude in the order of plus or minus one-half mil, or as may be preselected and desired.

Thusly, it will be seen that after the spacing between the roller members 10 and 12 has been initially preset manually by the operator, the subject control apparatus is operative to reset said spacing to this preset value at the end of each coil or length of strip when the reset control button 88 is closed. Then during each of the sample OFF periods, the setting of the servo reset potentiometer 42 is matched relative to the setting of the reference potentiometer 40, without moving the screwdown device 34 or changing the relative spacing of the roller members 10 and 12.

The present application is related to a copending application Serial No. 662,425, now Patent No. 3,045,517, filed May 29, 1957, by J. W. Wallace and R. E. Hull, entitled Position Control Apparatus, and assigned to the same assignee as the present application.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In control apparatus for a machine device including a first work member and a second work member operative with a motor for controlling the spacing between said work members and a workpiece for performing a predetermined operation relative to said workpiece, the combination of a thickness measuring device operative with said workpiece for providing a first control signal that varies as a function of the thickness of said workpiece, a first control device operative with said motor and responsive to said first control signal for controlling the spacing between said work members in accordance with the variations of said first control signal, a second control device responsive to the spacing between said work members for providing a second control signal that varies proportionally with the spacing between said work members, with said first control device being responsive to said second control signal such that said second control signal is differentially combined with said first control signal for controlling the spacing between said work members in accordance with the difference between said first and second control signals.

2. In control apparatus for a device including a first work member and a second work member that are operative with a workpiece for performing a predetermined operation relative to said workpiece, with said device including a motor operatively connected to at least one of said work members for controlling the spacing between said work members, the combination of a workpiece thickness sensing device operative with said workpiece for providing a first control signal that varies as a function of the thickness of said workpiece, a first control device operative with said motor and responsive to said first control signal for controlling the spacing between said work members in accordance with the variations of said first control signal, a second control device responsive to the spacing between said work members for providing a second control signal that varies proportionally with the spacing between said work members, and a third control device operative with said motor and differentially responsive to said first control signal and said second control signal for controlling for at least a predetermined time period the spacing between said work members in accordance with the difference between said first and second control signals.

3. In control apparatus for a strip rolling mill including a first roller member and a second roller member that are relatively spaced and operative with a strip of material for controlling the thickness of said strip of material, with said rolling mill further including a screwdown motor operatively connected to at least one of said roller members for controlling the spacing between said roller members, the combination of a strip thickness measuring device operative with said strip of material for providing a first control signal that varies as a function of the thickness of said strip, a first control device operative with said screwdown motor and responsive to said first control signal for controlling the spacing between said roller members in accordance with the variations of said first control signal, a second control device responsive to the spacing between said first and second roller members, with said second control device including a variable voltage source operatively connected to at least one of said roller members for providing a second control signal having a magnitude that varies as a function of the spacing between said roller members, with said first control device being additionally responsive to said second control signal such that said second control signal is differentially combined with said first control signal for controlling the spacing between said roller members in accordance with the difference between said first and second control signals.

4. In control apparatus for a strip rolling mill including a first roller member and a second roller member that are relatively spaced and operative with a strip of material for controlling the thickness of said strip of material, with said rolling mill further including a screwdown motor operatively connected to at least one of said roller members for controlling the spacing between said roller members, the combination of a strip thickness measuring device operative with said strip of material for providing a first control signal that varies as the function of the thickness of said strip, a first control device operative with said screwdown motor and responsive to said first control signal for controlling the spacing between said roller members in accordance with the variations of said first control signal, a second control device responsive to the spacing between said first and second roller members, with said second control device including a variable voltage source operatively connected to at least one of said roller members for providing a second control signal having a magnitude that varies as a function of the difference between the spacing between said roller members and a predetermined reference spacing of said roller members, with said first control device being responsive to said second control signal such that said second control signal is differentially combined with said first control signal for controlling the spacing between said roller members.

5. In control apparatus for a machine device including a first work member and a second work member operative with a workpiece for performing a predetermined operation relative to said workpiece, said machine device further including a motor operatively connected to at least one of said work members for controlling the spacing between said work members, the combination of a thickness measuring device operative with said workpiece for providing a first control signal that varies as a function of the thickness of said workpiece, a first control device operative with said motor and responsive to said first control signal for controlling the spacing between said work members in accordance with the variations of said first control signal, a second control device responsive to the actual spacing between said first and second work members and including a control bridge circuit having a first variable control member that is varied in accordance with a predetermined reference spacing between said work members and a second variable control member that is varied as a function of the actual spacing between said work members, with said control bridge circuit being operative to provide a second control signal that varies in accordance with the difference between said predetermined reference spacing and said actual spacing, with said first control device being responsive to said second control signal such that said second control signal is differentially combined with said first control signal for controlling the spacing between said work members in accordance with the difference between said first and second control signals, and a third control device operative with said motor and responsive to said first control signal for controlling the spacing between said work members in accordance with the variations of said first control signal, with said third control device having a lower response time than said first control device.

6. In control apparatus for a device including a first work member and a second work member that are relatively spaced and operative at a first location with a moving workpiece for controlling the thickness of said workpiece at said first location, with said device including a first motor operatively connected to at least one of said work members for controlling the spacing between work members, the combination of a thickness sensing device operative with said workpiece and positioned at a second location a predetermined distance away from said first location for providing a first control signal that varies as a function of the thickness of said workpiece at said second location, a first control device operative with said motor and responsive to said first control signal for controlling the spacing between said work members in accordance with the variations of said first control signal, a second control device responsive to the spacing between said work members for providing a second control signal that varies as a function of the spacing between said work members, and a third control device operative with said motor and responsive to said first control signal and to said second control signal for controlling for a predetermined time period the spacing between said work members in accordance with the difference between said first control signal and said second control signal, with said predetermined time period not being greater than the time required for a given portion of said strip to move from said first location to said second location.

7. In control apparatus for a machine device including a first work member and a second work member operative with a workpiece for performing a predetermined operation relative to said workpiece, with said machine device including a motor operatively connected to at least one of said work members for controlling the spacing between said work members, the combination of a thickness measuring device operative with said workpiece for providing a first control signal that varies as a function of the thickness of said workpiece, a first control device operative with said motor and responsive to said first control signal for controlling the spacing between said work members in accordance with the variations of said first control signal, a second control device responsive to the spacing between said work members for providing a second control signal that varies as a function of the spacing between said work members, with said first control device being responsive to said second control signal such that said second control signal is differentially combined with said first control signal for controlling the spacing between said work members in accordance with the difference between said first and second control signals, and a sampling control device operative with said first control device for periodically allowing, for a first time period, said difference between the first and second control signals to control said spacing and then preventing, for a second time period, said difference between said first and second control signals to control said spacing.

8. In control apparatus for a device including a first roller member and a second roller member that are relatively spaced and operative with a moving strip of material for controlling the thickness of said strip of material at a first location, with said device further including a motor operatively connected to at least one of said roller members for controlling the spacing between said roller members at said first location, the combination of a thickness measuring device operative with said strip and positioned at a second location along the strip movement path for providing a first control signal that varies as a function of the thickness of said strip at said second location, a first control device operative with said motor and responsive to said first control signal for controlling the spacing between said roller members in accordance with the variations of said first control signal, a second control device responsive to the spacing between said roller members for providing a second control signal that varies as a function of the spacing between said roller members, with said first control device being responsive to said second control signal such that the spacing between said roller members is controlled by said first control device in accordance with the difference between said first and second control signals, and a sampling control device operative with said first control device for periodically supplying to said first control device said difference between the first and second control signals to control the spacing between said roller members for a first time period, and with said sampling control device being operative for a second time period to disconnect said first control device relative to said motor such that said difference between the first and second control signals does not control the spacing between said roller members during said second time period, with the sum of said first time period and said second time period being not greater than the travel time of a given portion of said strip between said first location and said second location.

9. In a control apparatus for a machine device including a first work member and a second work member operative with a workpiece for controlling the thickness of said workpiece, with said machine device including a motor operatively connected to at least one of said work members for controlling the spacing between said work members, the combination of a thickness measuring device operative with said workpiece for providing a first control signal that varies as a function of the thickness of said workpiece, a first control device operative with said motor and responsive to said control signal for controlling the spacing between said work members in accordance with the variations of said first control signal, a second control device responsive to the spacing between said work members for providing a second control signal that varies as a function of the spacing between said work members, with said first control device being responsive to said second control signal such that said second control signal is differentially combined with said first control signal for controlling the spacing between said work members in accordance with a predetermined difference between said first and second control signals, and a sampling control device operative with said first control device for periodically allowing said difference between the first and second control signals to control said spacing for a first time period and then preventing said difference between said first and second control signals to control said spacing for a second time period, and a third control device operative with said motor and responsive to said first control signal for controlling the spacing between said work members in accordance with the variations of said first control signal, with said third control device having a lower response time than said first control device in controlling the operation of said motor.

10. In control apparatus for a strip rolling mill including a first roller member and a second roller member operative with a strip of material for determining the thickness of said strip, with said mill including a screwdown motor operatively connected to at least one of said roller members for controlling the spacing between said roller members, the combination of a strip thickness sensing device operative with said strip for providing a first control signal that varies as a function of the thickness of said strip, a first control device operative with said screwdown motor and responsive to said first control signal for controlling the spacing between said roller members in accordance with the variations of said first control signal, a second control device responsive to the spacing between said roller members for providing a second control signal that varies as a function of the spacing between said roller members, a sampling control device operative with said first control device for periodically supplying to said first control device said difference between said first and second control signals for a first time period and then for discontinuing the supply of said difference to said first control device for a second time period, with said first control device being responsive to said second control signal such that the spacing between said roller members is controlled by said motor in accordance with a predetermined difference between said first and second control signals, and a third control device including a second motor and responsive to said second control signal for bringing said second control signal substantially to zero during each of said second time periods.

11. In control apparatus for a strip rolling mill including a first roller member and a second roller member that are operative with a strip of material for determining the thickness of said strip, with said mill including a screwdown motor operatively connected to at least one of said roller members for controlling the spacing between said roller members, the combination of a strip thickness sensing device operative with said strip for providing a first control signal that varies as a function of the thickness of said strip, a first control device operative with said screwdown motor and responsive to said first control signal for controlling the spacing between said roller members in accordance with the variations of said first control signal, a second control device responsive to the spacing between said roller members for providing a second control signal that varies as a function of said spacing, a sampling control device operative with said first control device for supplying a signal to said first control device for a first time period to control the spacing between said roller members in accordance with a predetermined difference between said first and second control signals, with said sampling control device being operative with said first control device to discontinue supplying said signal to said first control device for a second time period, with said second control device including a variable control member that is varied as a function of the spacing between said roller members relative to a predetermined reference spacing, and a third control device including a reset motor operative with said variable control member to vary said control member in accordance with said predetermined reference spacing during each of said second time periods.

References Cited in the file of this patent

UNITED STATES PATENTS

| | | |
|---|---|---|
| 1,969,536 | Winne | Aug. 7, 1934 |
| 2,105,431 | Mohler et al. | Jan. 11, 1938 |
| 2,264,096 | Mohler | Nov. 25, 1941 |
| 2,687,052 | Zeitlin | Aug. 24, 1954 |
| 2,735,051 | Gille | Feb. 14, 1956 |
| 2,851,911 | Hessenberg | Sept. 16, 1958 |
| 2,883,895 | Vossberg | Apr. 28, 1959 |

FOREIGN PATENTS

| | | |
|---|---|---|
| 455,237 | Canada | Mar. 15, 1949 |

OTHER REFERENCES

Control Engineering, March 1955, pages 42–47.

"Continuous Gaging," Automation, March 1956, pages 52–57.